United States Patent [19]
Drower et al.

[11] 3,918,188
[45] Nov. 11, 1975

[54] LAMINATING POUCH AND INTEGRATED CARRIER

[75] Inventors: Herbert M. Drower, Wilmette; Robin Korinek, Barrington, both of Ill.

[73] Assignee: Transilwrap Company, Inc., Chicago, Ill.

[22] Filed: Mar. 14, 1974

[21] Appl. No.: 450,979

[52] U.S. Cl. .............................. 40/158 R
[51] Int. Cl.² ........................... G09F 1/10
[58] Field of Search ............. 40/158, 158 B, 2.2, 10, 40/135, 104.18; 156/108, 249; 161/147; 283/45, 15

[56] References Cited
UNITED STATES PATENTS

| 2,360,328 | 10/1944 | Bell | 283/45 |
| 2,815,126 | 12/1957 | Deckers | 281/20 |
| 3,417,497 | 12/1968 | Hannon | 40/2.2 |
| 3,505,140 | 4/1970 | Dunn | 40/2.2 |
| 3,679,512 | 7/1972 | Macone | 40/2.2 X |

Primary Examiner—Robert W. Michell
Assistant Examiner—Wenceslao J. Contreras
Attorney, Agent, or Firm—Kinzer, Plyer, Dorn & McEachran

[57] ABSTRACT

A method, pouch and integrated carrier for use in uniting a protective film with a data card or like core insert of predetermined size and configuration, wherein two protective films joined at one edge to form a pouch have two carrier sheets affixed to that edge of the pouch which cover the exterior of the pouch. Additionally, the two joined protective sheets are precision cut to form a center panel surrounded by a rim and connected to the rim by frangible bridges, the center panels being in precise registry with each other.

8 Claims, 4 Drawing Figures

U.S. Patent  Nov. 11, 1975  3,918,188
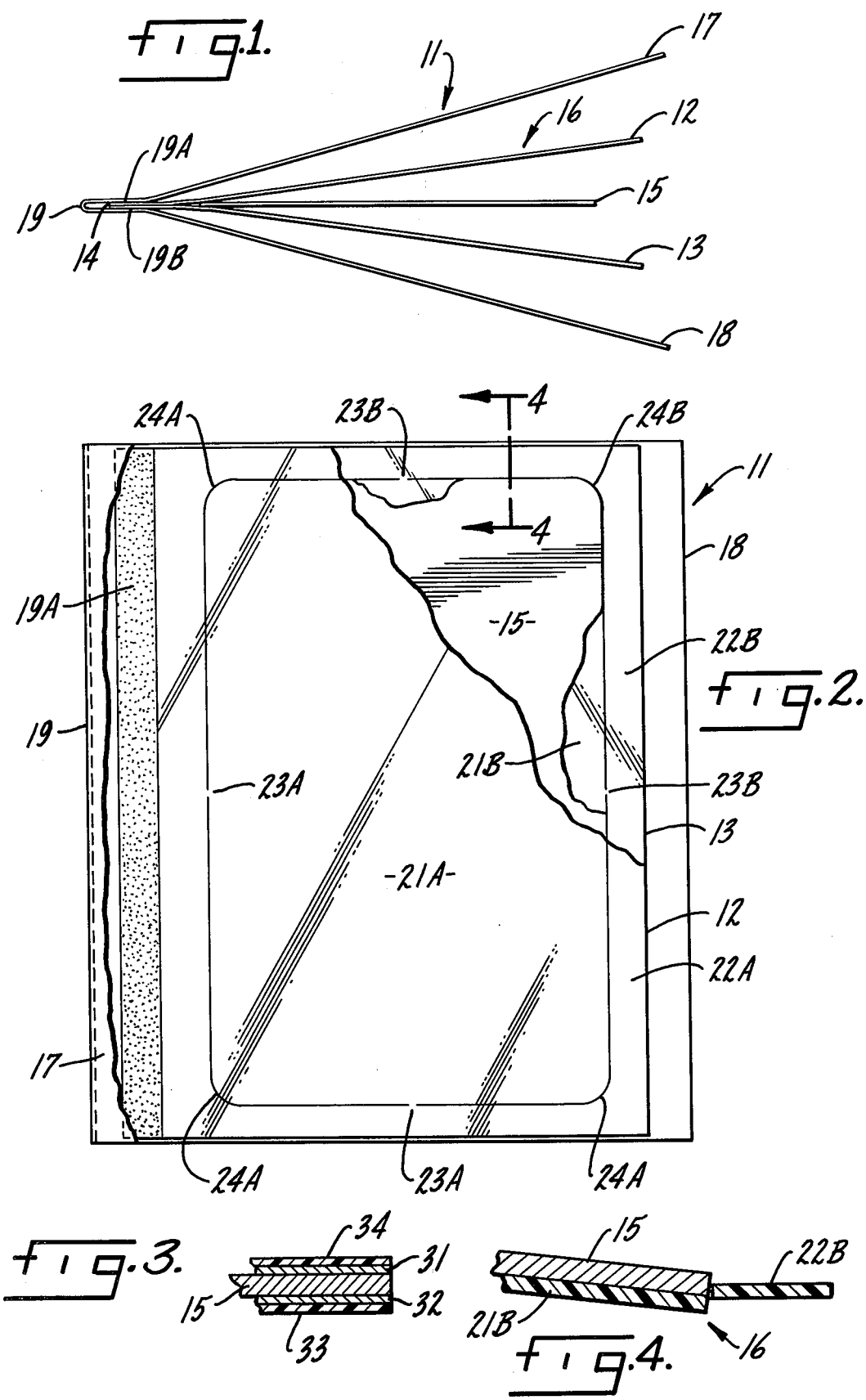

LAMINATING POUCH AND INTEGRATED CARRIER

BACKGROUND OF THE INVENTION

The use of laminated plastic data cards has rapidly increased in recent years. Large corporations and governmental bodies regularly issue hundreds of thousands of cards annually. Unfortunately, the cost of equipment used in mass production of data cards is prohibitive to the school or small business which needs to make only a few cards daily or which makes a moderate number of cards on only a few occasions each year. Thus, various methods to produce plastic laminated data cards on a small scale basis, using a minimum of equipment, have been tried.

Some of these methods have merely called for inserting a data sheet between two sheets of laminating material to give a product which is subsequently cut to a final desired shape. However, the cutting is time-consuming, often inaccurate, and rather wasteful of the plastic laminating material.

Other methods have used pre-cut plastic laminating materials, sealed at one edge to form an overlaminate pouch, to obtain proper alignment between the overlaminate and the core of a finished card. Some of these processes are shown in U.S. Pat. Nos. 3,526,567 and 3,679,512, and 3,679,514. One of the largest problems affecting the industry has been the proper alignment of the core material within the protective cover sheets; for example, see co-pending application Ser. No. 344,139 filed Mar. 23, 1973, now superseded by application Ser. No. 542,232 filed Jan. 20, 1975.

In the past, laminating pouches with the core material sandwiched between the sheets have been inserted into a separate folder of heavy stock paper, called a carrier, which covers both exterior sides of the pouch and which is inserted between the rollers of a laminator. The carrier serves a dual purpose: it protects the rollers from any adhesive which might ooze from the pouch during lamination and also provides a link between roller pairs in the laminator, which are generally spaced farther apart than the length of an individual data card. In this regard, a stiff carrier has been required, to aid the insertion of the carrier between the first set of rollers and to assure effective entry into the second set of rollers.

SUMMARY OF THE INVENTION

It is a primary object of the present invention to produce a laminating pouch which is capable of allowing easy alignment of core material by a user.

A related object is to produce an integrated laminating pouch incorporating a thin paper carrier sheet, and thereby reduce the steps of a user in producing a laminated product.

A further object is to provide an integrated laminating pouch, useful for enclosing a data card or like core element, which can be easily and accurately assembled by an unskilled user.

In accordance with the invention, a laminating pouch for use in uniting a protective film with a data card or like core element of predetermined size and configuration, includes two sheets of protective film material, each substantially larger than the core element to be protected, joined together along one edge to form a pouch, the two protective film sheets being precision cut to form a center panel surrounded by a rim and connected to the rim by a plurality of frangible bridges, the two center panels being in accurate registry with each other and each corresponding in size and configuration to the core element. Additionally two carrier sheets are affixed to the joined edge of the pouch and cover the entire exterior of the pouch. Moreover, the invention encompases a method for preparing a lamination pouch for use with core elements of predetermined size and configuration which includes the steps of joining two sheets of protective film material, each substantially larger than a core element, along one edge to form a pouch and, following the joining, precision cutting both sheets to form in each a center panel surrounded by a rim and connected to the rim by a plurality of frangible bridges. Additionally, the method includes affixing two thin paper carrier sheets to the joined edge of the pouch and covering the entire exterior of the pouch.

BRIEF DESCRIPTION OF THE DRAWINGS

Other objects and advantages of the invention will become apparent upon reading the following detailed description and upon reference to the drawings, in which:

FIG. 1 is a side elevation view of a pre-cut integrated laminating pouch constructed in accordance with one embodiment of the present invention, showing placement of a core insert;

FIG. 2 is a plan view, with portions cut away, of the pouch of FIG. 1 closed around a core insert;

FIG. 3 is a sectional view of an embodiment of a laminated card constructed in accordance with the preferred form of the present invention; and, FIG. 4 is a partial sectional view of a pouch constructed in accordance with the invention closed over a core insert taken approximately along line 4—4 in FIG. 2.

DETAILED DESCRIPTION OF THE INVENTION

FIG. 1 illustrates a pre-cut integrated data card laminating pouch 11, prepared in accordance with a preferred embodiment of the present invention, and a core insert 15 of predetermined size and shape. Pouch 11 includes two sheets of protective overlaminate film 12 and 13 which are joined at one edge 14, both sheets being substantially larger than a core insert 15 to be incorporated in the finished laminated data card. Sheets 12 and 13 form an inner pouch 16 into which desired core inserts 15 can be placed. The inner pouch 16 has two thin paper carrier sheets 17 and 18 affixed to the joined edge 14. Carrier sheets 17 and 18 are substantially larger than the overlaminate sheets 12 and 13. The two carrier sheets 17 and 18 can constitute separate pieces of thin, inexpensive paper, but a single thin paper sheet folded along one edge 19 is preferred. As seen in FIGS. 1 and 2, carrier sheets 17 and 18 can be attached to pouch 16 by two adhesive strips 19A and 19B. Instead of adhesive strips, a thin line or dots of adhesive can also be utilized.

As best seen in FIG. 2, the protective sheets 12 and 13 are precut to form two center panels 21A and 21B surrounded by rim portions 22A and 22B, respectively. Center panel 21A is connected to rim 22A by frangible bridges 23A. Similarly, center panel 21B and rim 22B are connected by the frangible bridges 23B. The center panels of both protective sheets 12 and 13 are in registry with each other and each correspond in size and configuration to the core insert 15.

A user of an integrated laminating pouch of the present invention has merely to place a core insert 15 between protective sheets 12 and 13 and align it with the precut center panels 21A and 21B. Since the core element 15 is exactly the same size as the center panels, it will tend to force the corners 24A and 24B of the center panels 21A and 21B away from the rims 22A and 22B and rest against the associated inner sides of rims 22A and 22B. Thus, rims 22A and 22B effectively and accurately align core 15 in registry with overlaminate panels 21A and 21B for lamination. Since both protective sheets 12 and 13 have precision cut center panels 21A and 21B, both rim portions 22A and 22B tend to hold core 15 in place.

Turning to FIG. 4, a partial sectional view along line 4—4 of FIG. 2 shows pouch 16 closed over core insert 15. Core 15 is matched with center panel 21B while rim 22B tends to overlap core 15 and restrain core 15 from movement. Accordingly, frangible bridges 23A and 23B should be placed so that this restraining overlap restricts movement of the core in all directions. For a rectangular card, the preferred number of bridges is four, each bridge being located in the middle of one edge of the card. However, a larger or lesser number of frangible bridges can be used if desired.

In some instances, it may be desirable to have a different number of frangible bridges on each center panel. In those instances, when the center panels are cut, the die must only cut away the frangible bridge in one of the center panels. For example, the four bridges 23B could remain joining center panel 21B to frame 22B and all but one of bridges 23A could be cut through.

When the core is made of a material which will not bond to the material of the center panels, such as paper, the core may be made smaller than the center panels. Although the benefit of accurate alignment of the core and both center panels is hindered with a smaller core, the user can align the core by sight, and there is still a benefit gained by the built-in alignment of both center panels with each other. Moreover, the convenience of breaking the finished card from the rim is retained.

When using the integrated pouch 11, one simply feeds edge 19 of the carrier sheets 17 and 18 into the rollers of a pouch laminator. Carrier sheets 17 and 18 are made of thin, inexpensive paper, which protects the rollers of a laminator from any oozing adhesive from the interior sheets. During the lamination process, center panels 21A and 21B and core insert 15 are united to form a data card. Similarly, the rim portions 22A and 22B of the overlaminate sheets 12 and 13 are bonded together.

After lamination, the laminated integrated pouch 11 is removed from the laminator and carrier sheets 17 and 18 are separated. The frangible bridges 23A and 23B are then broken to separate the center panels and united core insert, which form a finished laminated data card, from rims 22A and 22B. The pouch 16 has thus provided an accurate alignment means for lamination of the identification card.

Whenever the term "sheet" has been referred to in describing the invention, it is meant that a sheet becomes one layer in the pouch or in the final laminated card, or constitutes a layer of carrier material. Thus, protective sheets 12 and 13 may actually be a single piece of protective film material which is folded in half and creased at edge 14; however, two sheets are formed in the final card. Similarly, carrier sheets 17 and 18 can either be two separate sheets adhered to pouch 16 or can be a single piece of paper folded in half to provide two carrier sheets.

While any means of lamination can be used such as adhesive, pressure or heat treatment methods, it is preferred to use a method of heat and pressure treatment to laminate the data cards. Thus, a preferred form of protective film for the overlaminate sheets 12 and 13 is itself a laminate of a tough plastic, such as one of the esters of polyterephthalic acid, with an interior surface of a heat bondable thermoplastic material such as polyethylene. Similarly, it is desired to use a core insert 15 having surfaces which are readily bondable to the protective sheets 12 and 13. In a preferred example, the core sheet may be formed of a central layer of one of the esters of polyterephthalic acid, coated with polyethylene or other material readily bondable to polyethylene. Thus, a product as in FIG. 3 will be produced with protective sheets 34 and 33, core insert 15 and bonding layers 31 and 32.

In preparing the pouch 11, it is essential that the center panels 21A and 21B be aligned accurately. In order to provide the requisite accurate registry of the center panels, the following steps should be carried out in order. First, protective sheets 12 and 13 should be joined at one edge 14. This is easily accomplished by folding a piece of overlaminate film so that the protective layers of the film will form the exterior of the final laminated card and the bondable layers will form the interior surfaces, the surfaces that are folded together. Accordingly, edge 14 can have a small portion sealed to hold protective sheets 12 and 13 in accurate alignment. Of course, it would be possible to start out with two separate sheets 12 and 13 and bond the sheets together along the one edge 14 to provide the same structure. The protective sheets could also be joined by adhesive or in any other suitable manner.

After protective sheets 12 and 13 have been joined at the one edge 14, a precision cutting of both center panels surrounded by rims and connected to the rims by frangible bridges is made while both protective sheets 12 and 13 are held with their interior surfaces together. Thus, there is provided a precise registry of the cut in both protective sheets. A single, simple die-cutting operation carries out this stop of the process.

In a preferred embodiment, there are four frangible bridges each at the middle of each side of a rectangular center panel. This allows the portions of the rim at each corner of the rectangle to collapse around an inserted core element to lock it in place. The frangible bridges should be strong enough to hold the center panel in place during normal handling and set up of the identification card; however, they should be thin enough and weak enough to be broken away from the rim portion by simple manual pressure when the card is finally laminated. It is preferred that the bridges be narrow enough so that when broken they do not leave noticeable projections at the edges of the finished data card. If the bridges are made too thick, the problem can be resolved by cutting them with a thin blade such as a razor blade. In any case there should not be too many evenly spaced bridges so as to stop overlap of the rim around the insert core element, because this overlap of the rim portion holds the core in accurate alignment in the pouch.

It should be noted that because the protective sheets 12 and 13 are substantially larger than the core element 15, they are useful in providing a stiff carrier edge all around the core and the center panels 21A and 21B, which allows the card assembly to be easily inserted and processed through the rollers of a conventional pouch laminating machine.

I claim:

1. A laminating pouch for use in uniting a protective film with a data card or like core insert of predetermined size and configuration, comprising:
   two sheets of protective film material, each substantially larger than the core insert to be protected, joined together along one edge to form a pouch,
   the two protective film sheets each being precision cut to form a center panel surrounded by a rim and connected to the rim by a plurality of frangible bridges, the two center panels being in accurate registry with each other and each corresponding precisely in size and configuration to the core insert.

2. A laminating pouch as in claim 1, wherein said protective film material includes a thermoplastic inner surface which is heat sealable to the core insert.

3. A laminating pouch as in claim 2, wherein said protective film material comprises a laminate of an outer layer of a tough protective material forming the exterior of the pouch and a layer of heat sealable thermoplastic material facing the interior of the pouch.

4. A laminating pouch as in claim 1 wherein each frangible bridge is located approximately at the middle of one edge of the core insert.

5. A laminating pouch as in claim 4, for use with a rectangular core insert, including four frangible bridges each located approximately at the middle of one edge of the core insert.

6. A laminating pouch as in claim 1, including two thin paper carrier sheets, affixed to said one edge of the pouch and completely covering the exterior of the pouch.

7. A laminating pouch as in claim 6, wherein each frangible bridge is located at the middle of one edge of the core insert.

8. A laminating pouch as in claim 7, for use with a rectangular core insert, including four frangible bridges each located approximately at middle of one edge of the core insert.

* * * * *